March 28, 1944. K. LAUGHEAD ET AL 2,345,400
STOCK WATERING DEVICE
Filed March 7, 1942
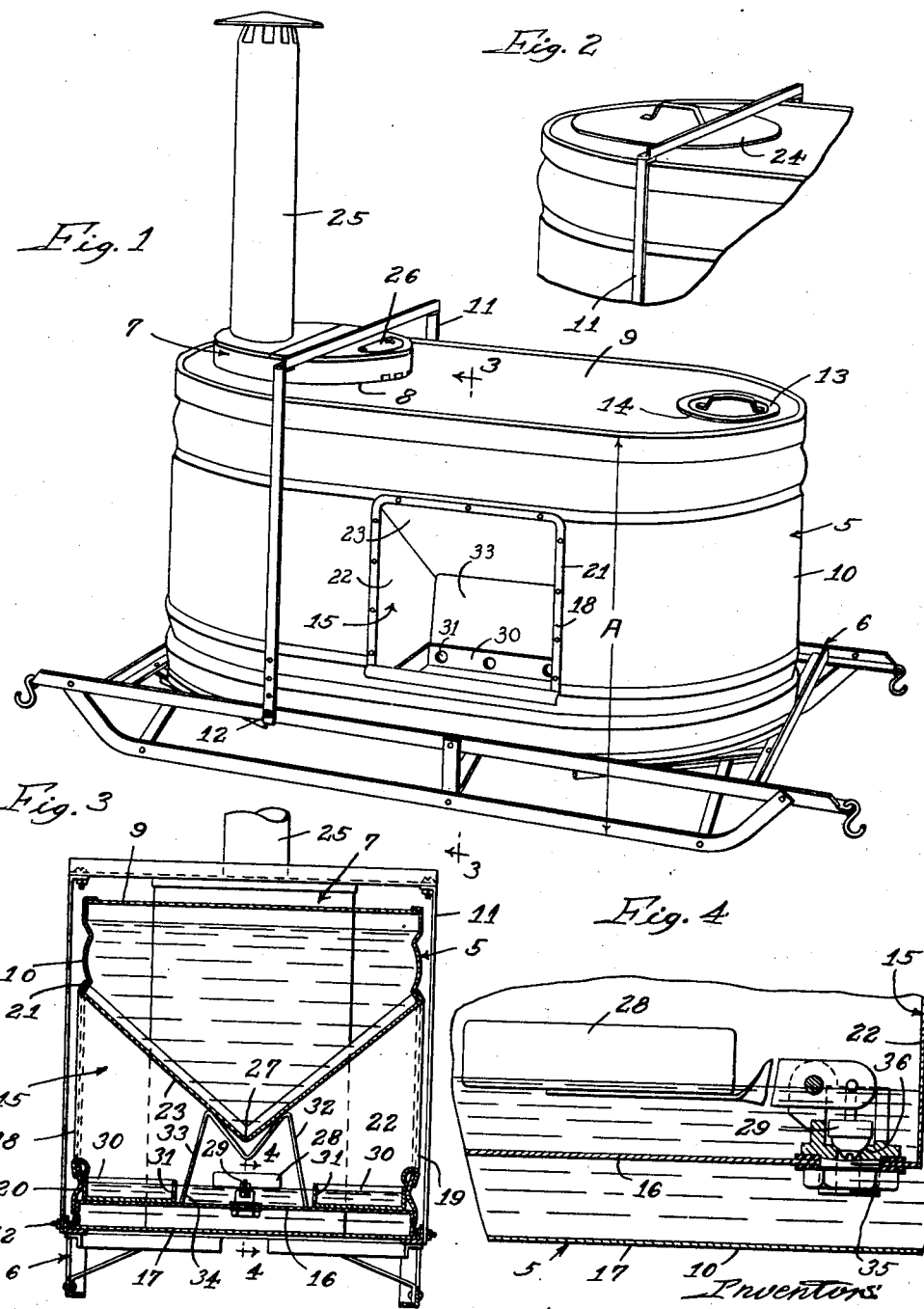

Patented Mar. 28, 1944

2,345,400

UNITED STATES PATENT OFFICE 2,345,400

STOCK WATERING DEVICE

Kelly Laughead, Columbus, Ohio, and Maurice H. Keating, Minneapolis, Minn., assignors to H. D. Hudson Manufacturing Company, Chicago, Ill., a corporation of Minnesota Application March 7, 1942, Serial No. 433,736

10 Claims. (Cl. 119—73)

This invention relates to a new and improved stock watering device suitable for use by hogs, sheep, and other animals.

Stock waterers as heretofore constructed invariably had exposed flame type heaters that were apt to be extinguished by sudden drafts or by overflow of water so that that method of preventing freezing in cold weather, besides being a fire hazard under certain conditions, was generally unsatisfactory otherwise. Another objection to these earlier constructions is that they involved the necessity for an outer jacket in spaced relation to the water tank for the circulation of heat, thus exposing for direct radiation to the atmosphere the entire jacket, so that even under ideal operating conditions there was very low heating efficiency and greater fuel consumption was required. Furthermore, in most of these earlier devices, the trough was more or less directly exposed to the elements so that the water was apt to freeze despite the provision of a heater or heaters to prevent freezing of the water in the main tank, and, where efforts were made to overcome that objection by concentrating the heat under or in the vicinity of the trough, there was danger of the water in the trough being heated too much, and in some of these designs such an arrangement necessitated too much exposure of the burner or burners, the objections to which have already been noted. It is, therefore, the principal object of our invention to provide a stock watering device eliminating these objections.

A salient feature of the present device consists in the provision of a water tank with a trough substantially entirely enclosed within the walls of the tank, so that the water in the trough even though exposed, as necessary for drinking, is separated from the main body of water only by a thin sheet metal wall, through which sufficient heat can pass to prevent freezing of the water in the trough even in the coldest weather, the tank having heater means to prevent freezing of the water therein. The bottom of the trough is preferably in elevated relation to the bottom of the tank for circulation of water therebetween and with that arrangement the float valve in the trough can be located so that the water enters the trough through the bottom, which we have found gives most satisfactory results and is far more practical than having the intake for the trough in the side wall or elsewhere.

Another salient feature of the present device consists in the provision of an immersion type heater insertable through an opening in the top of the water tank so that substantially the entire heater is enclosed in the tank and the water therein can circulate around the heater for most efficient heating, heat losses and consequent fuel consumption being reduced to a minimum by this arrangement. Furthermore, there is much less likelihood of the heater being accidentally extinguished, and when the heater is removed there is increased water storage capacity in the tank, which, of course, is highly desirable for summertime operation. The fact that the water tank itself forms the jacket for the heater makes it possible to eliminate the extra outer jacket, at a considerable reduction in cost. The heater has suitable hold-down means to keep it in place down in the tank against the buoyancy attributable to the water displaced thereby.

Another important feature of the present device is the fact that its overall height has been reduced to such an extent that the device can be moved on a sled under the spout of the pump and filled directly, thus saving a lot of tedious work.

The invention is illustrated in the accompanying drawing, in which—

Figure 1 is a perspective view of the watering device of our invention, shown mounted on a sled for easy movement to and from the pump, and having the heater installed therein;

Fig. 2 is a perspective view of a portion of Fig. 1, showing a cover closing the opening in the tank from which the heater has been removed;

Fig. 3 is a vertical cross-section on the line 3—3 of Fig. 1, and

Fig. 4 is an enlarged sectional detail of the float valve taken on the line 4—4 of Fig. 3.

The same reference numerals are applied to corresponding parts throughout these views.

The reference numeral 5 designates the stock watering device generally, and 6 the sled therefor on which the device is adapted to be removably mounted. 7 indicates the immersion type heater, which is entered through a large opening 8 in the top wall 9 of the tank 10 of the watering device to keep the water in the tank well above the freezing point. An inverted U-shaped frame 11 straddles the heater end of the tank 10 and is arranged to be fastened to the sled 6, as indicated at 12, to hold the heater down in the tank, that being required because of the buoyancy due to the amount of water displaced by the heater, especially when the tank is filled. 13 is a cover closing a filler opening 14 in the top 9 at the opposite end of the tank from the heater opening 8. The sled 6 can, of course, be made very shallow, and the tank 10 is made of much smaller height than other stock waterers so that the overall height dimension A is small enough to permit running the waterer directly under the spout of the pump in the farmyard to fill the tank through the opening 14. Usually stock waterers are designed with the filler opening so high that the tank could not possibly be filled directly from the pump, and, in fact, it is usually difficult to lift a bucket that high to empty it into the tank. The present device thus saves a lot of heavy tedious work. The watering trough, indicated generally by the reference numeral 15, is in accordance with our invention built into the tank with the substantially horizontal bottom 16 of the trough in vertically spaced substantially parallel relation to the bottom 17 of the tank, but not high enough to interfere with hogs and sheep, for example, drinking from the trough through the open ends 18 and 19. The openings 18 and 19 are formed directly in the side wall 20 of the tank, the ends of the trough 15 being flanged outwardly, as indicated at 21, and fastened to the side walls in water-tight relationship thereto. In view of the fact that the trough 15 has its bottom wall 16, side walls 22 and top wall 23 surrounded by water in the tank, the warmth of that water is conducted through the comparatively thin sheet metal walls well enough to eliminate the likelihood of the relatively small body of water in the trough freezing, even in very cold weather, so long as the heater 7 is kept operating properly. The trough being built into the tank is, of course, more or less protected otherwise from the weather and the water contained therein is thereby further protected against freezing. In summertime operation, the arrangement also has important advantages from the standpoint that the large body of water in the tank tends to keep the small body of water in the trough cooler than where the trough is more or less exposed, as in prior constructions. The removal of the heater 7 gives increased capacity, which, of course, is highly desirable in the summertime. A removable cover 24 closes the opening 8 when the heater is removed, and, if desired, the frame 11 can be used to prevent accidental displacement of the cover. The heater relies for its draft on a small stack 25, and it has a small lid 26 which can be swung around to an open position to permit adding fuel. Any suitable or preferred type of heater can be used, although we have found that the best results and most economical operation are obtained with wood and coal. The direct contact of the water in the tank with the side walls of the heater and the fact that the water can circulate around the heater substantially its full length make for most efficient heat transfer and minimum heat loss.

The top wall 23 for the trough 15 is V-shaped in longitudinal section, as indicated in Fig. 3, so that while the openings 18 and 19 are easily large enough to admit the head of a large hog, the capacity of the tank 10 is not reduced proportionately, there being little more than sufficient room below the middle or apex portion 27 of the V-shaped top wall for the float 28, which operates the valve 29, to maintain a predetermined level of water in the trough, this float valve being disposed in the middle of the trough, as shown. Shallow sheet metal trays 30 are placed in the opposite ends of the trough and have openings 31 in the side walls thereof for free circulation of water. These trays can be removed from time to time and cleaned out, and they will collect most of the debris that would otherwise in time tend to fill up the trough and interfere with the proper operation of the device as a whole besides clogging the float valve. An M-shaped flexible sheet metal guard or spacer 32 is provided in the trough under the middle portion 27 of the top wall 23 in spaced relation to the float 28 and valve 29. The legs 33 of this guard rest on the bottom of the trough next to the trays 30 so as to space the trays and hold them in place, away from the float valve, and at the same time keep smaller hogs from getting their heads lodged under the middle portion 27 of the top wall and interfering with the operation of the float valve. The guard to some extent also keeps debris away from the float valve. Openings 34 in the lower end of the legs 33 allow easy circulation of water from the float valve to both ends of the trough and to the trays 30. The fact that the valve 29 has the plug 35 thereof, in which the seat 36 is provided, mounted in the bottom wall 16 of the trough is found to reduce the likelihood of clogging of the valve to a minimum, because the water entering the trough from beneath causes any straw or dirt that may have settled on or next to the valve seat to be raised clear of the seat and be washed away. Heretofore float valves in many other devices were placed on the side wall of watering troughs, where the lodging of straw and sticks in the valve caused a lot of trouble. Those difficulties have been reduced to a minimum by the present arrangement.

It is believed the foregoing description conveys a good understanding of the objects and advantages of our invention. The appended claims have been drawn with a view to covering all legitimate modifications and adaptations.

We claim:

1. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, the bottom of the trough being in spaced elevated relation to the bottom of the tank, a float operated valve in said trough controlling communication between the trough and tank to maintain water at a predetermined level in the trough, said valve being disposed substantially midway between the open ends of the trough, trays disposed in the opposite ends of said trough on opposite sides of said valve and removable from the trough through the open ends thereof, and a removable guard for the valve disposed in straddling relation to the valve with the opposite sides thereof in juxtaposition to the trays to maintain the trays in spaced relation to the valve, said valve being accessible upon removal of the trays and guard through the open ends of the trough.

2. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, the bottom of the trough being in spaced elevated relation to the bottom of the tank, a float operated valve in said trough controlling communication between the trough and tank to maintain water at a predetermined level in the trough, said valve being disposed substantially midway between the open ends of the trough, trays disposed in the opposite ends of said trough on opposite sides of said valve and removable from the trough through the open ends thereof, the top wall of the trough defining a V in longitudinal section with the middle portion thereof closest to the float valve, and a generally M-shaped guard for the float valve mounted in the trough in straddling relation to said valve, and with the lower end portions of the legs of the M in juxtaposition to the trays to maintain the same in spaced relation to said valve, the middle portion of the V-shaped top wall projecting into the top portion of the M-shaped guard to prevent displacement of the guard lengthwise relative to the trough.

3. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, said trough having communication with the tank to maintain water at a predetermined level in the trough, trays disposed in the opposite ends of said trough and removable therefrom through the opposite ends of the trough, the top wall of said trough being inclined downwardly from the opposite ends of the trough so as to define a V in longitudinal section, and a generally M-shaped flexible sheet metal guard removably mounted in the middle portion of the trough with the lower ends of the legs thereof in juxtaposition to the trays to limit inward displacement of the trays, the middle portion of the V-shaped top wall projecting down into the upper portion of the M-shaped guard so as to prevent longitudinal displacement of the guard relative to the trough.

4. In a stock waterer, a tank constituting a water reservoir, a heater in the tank around which the water in the tank is free to circulate to be heated, a water trough enclosed within said tank for circulation of water in the tank around the same, said trough having communication with said tank for maintenance of water at a predetermined level in the trough and being open to the outside of the tank for drinking purposes, said tank having a top wall provided with a filler opening and a second opening, the heater being an immersion type heater the casing of which is removably insertable downwardly through said second opening, a lid to close said second opening when the heater is removed, and a hold-down device for use interchangeably with said heater or said lid to prevent displacement thereof from said second opening.

5. In a stock waterer, an elongated tank constituting a water reservoir, said tank having bottom, side, and top walls for complete enclosure of the water therein, the top wall having an opening for a heater adjacent one end of the tank and also having a filler opening provided therein, closures for said openings, an elongated water trough disposed in transverse relation to said tank intermediate the ends thereof and substantially entirely enclosed within the walls of said tank but having the opposite ends thereof open through the side walls of the tank for access to the water in the trough from the outside of the tank on either side thereof, said trough having communication with the tank for maintenance of water at a predetermined level in the trough, said trough having the water in the tank circulating freely around the same to equalize temperature between the water in the tank and the water in the trough, and an immersion heater removably insertable in the aforesaid heater opening in the top wall so as to be disposed in the end portion of said tank in spaced transverse relation to the trough for free circulation of water around the heater and between it and the trough to heat the water in the trough by conduction of heat through the walls of the trough from the water in the tank.

6. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, said trough having communication with the tank to maintain water at a predetermined level in the trough, trays disposed in the opposite ends of said trough and removable therefrom through the opposite ends of the trough, and a removable spacer disposed in said trough having end portions disposed in juxtaposition to the trays to limit inward displacement thereof, and a top portion arranged to engage the top wall of the trough to prevent upward displacement of the spacer relative to the trough and trays.

7. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, the bottom of the trough being in spaced elevated relation to the bottom of the tank, a float operated valve in said trough controlling communication between the trough and tank to maintain water at a predetermined level in the trough, said valve being disposed substantially midway between the open ends of the trough, and a removable guard for the valve disposed in straddling relation to the valve with the opposite sides thereof in a predetermined spaced relation to the opposite ends of said trough, said valve being accessible upon removal of the guard through one of the open ends of the trough.

8. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, the bottom of the trough being in spaced elevated relation to the bottom of the tank, a float operated valve in said trough controlling communication between the trough and tank to maintain water at a predetermined level in the trough, said valve being disposed substantially midway between the open ends of the trough, the top wall of the trough defining a V in longitudinal section with the middle portion thereof closest to the float valve, and a generally M-shaped guard for the float valve mounted in the trough in straddling relation to said valve with the lower end portions of the legs of the M in a predetermined spaced relation to the opposite ends of said trough, and with the middle portion of the V-shaped top wall projecting into the top portion of the M-shaped guard to prevent displacement of the guard lengthwise relative to the trough.

9. In a stock waterer, the combination of a tank constituting a water reservoir, a water trough comprising top, bottom, and side walls, all within the tank and surrounded by the water therein, opposite ends of the trough being open to the outside of the tank for access to the water in the trough from either side of the tank, the bottom of the trough being in spaced elevated relation to the bottom of the tank, a float operated valve in said trough controlling communication between the trough and tank to maintain water at a predetermined level in the trough, said valve being disposed substantially midway between the open ends of the trough, the top wall of the trough defining a V in longitudinal section with the middle portion thereof closest to the float valve, and a generally M-shaped flexible sheet metal guard for the float valve removably mounted in the middle portion of the trough in straddling relation to said valve, with the lower ends of the legs thereof disposed in a predetermined spaced relation to the opposite ends of the trough, and with the middle portion of the V-shaped top wall projecting down into the upper portion of the M-shaped guard so as to prevent longitudinal displacement of the guard relative to the trough, said guard being removable by flexing the same to spread the legs thereof and accordingly lower the upper portion to pass under the middle portion of the V-shaped top wall.

10. In a stock waterer, an elongated tank constituting a water reservoir, said tank having bottom, side, and top walls for complete enclosure of the water therein, an elongated water trough disposed in transverse relation to said tank intermediate the ends thereof and substantially entirely enclosed within the walls of said tank but having the opposite ends thereof open through the side walls of the tank for access to the water in the trough from the outside of the tank on either side thereof, said trough having communication with the tank for maintenance of water at a predetermined level in the trough, said trough having the water in the tank circulating freely around the same to equalize temperature between the water in the tank and the water in the trough, the top wall of said tank having an opening provided therein adapted to receive a heater for disposition in one end portion of the tank vertically alongside and in spaced relation to the water trough, and an immersion heater removably insertable in said heater opening in the top wall so as to be disposed in the end portion of said tank in spaced transverse relation to the trough for free circulation of water around the heater and between it and the trough to heat the water in the trough by conduction of heat through the walls of the trough from the water in the tank.

KELLY LAUGHEAD.
MAURICE H. KEATING.